July 5, 1955 M. H. OLIN 2,712,147
WINDSHIELD WIPING AND CLEANING APPARATUS
Filed July 25, 1950

INVENTOR.
MILO H. OLIN
BY
ATTORNEY

United States Patent Office 2,712,147
Patented July 5, 1955

2,712,147

WINDSHIELD WIPING AND CLEANING APPARATUS

Milo H. Olin, Perry, N. Y.

Application July 25, 1950, Serial No. 175,739

10 Claims. (Cl. 15—250.4)

The present invention relates to windshield wipers and to combined windshield wipers and windshield cleaning mechanism for automotive vehicles.

Conventional windshield wipers are controlled from a control knob placed on the dashboard of the vehicle. One of the objections to this construction is that it requires the operator of the vehicle to remove one of his hands from the steering wheel both in order to put the windshield wiper into operation, and to stop its operation. This is dangerous especially if the vehicle is traveling at high speed.

Windshield cleaning systems are known which when put into operation will squirt water or a cleaning fluid over the windshield in the paths of the windshield wipers, permitting the wipers to clean insects, or dirt off the viewing portions of the windshield. With the known structures, however, the water or cleaning fluid is squirted on the windshield from below, which means that the cleaning fluid has to travel upward of the windshield against the action of gravity, and which means, moreover, that the water or cleaning liquid is locally applied and has to be spread over the windshield by the action of the windshield wipers. Moreover, because the delivery orifices are at the bottom of the windshield they tend to get clogged with dirt. Furthermore, with prior cleaning apparatus, two control knobs or buttons must be manipulated in order to effect the cleaning operation, one button being actuated to cause the cleaning liquid to be squirted on the windshield, and the other button being operated to effect the oscillation of the windshield wipers. Moreover, the driver must remove one hand from the steering wheel to effect each of these operations. Another disadvantage with conventional cleaning apparatus is that this apparatus is so constructed that the cleaning liquid is squirted on the windshield only for a limited period, and then shuts off. If the windshield is not clean, the control knob for the cleaning liquid must be pressed in again.

One object of the present invention is to provide a windshield wiper mechanism which can be controlled by a foot pedal, and which does not require the operator of the vehicle to remove his hands from the vehicle for starting the windshield wiping operation.

Another object of the invention is to provide an apparatus for applying a cleaning liquid to a windshield which is also controlled by a foot pedal.

A further object of the invention is to provide a combined mechanism for wiping a windshield and applying a cleaning liquid thereto in which both operations are controlled from a single control member.

A further object of the invention is to provide apparatus for wiping a windshield and for applying a cleaning liquid thereto which is so constructed that both operations are controlled by a single foot pedal.

Another object of the invention is to provide apparatus for cleaning a windshield in which the cleaning liquid is delivered to the windshield under force of air pressure, and not as in prior apparatus through operation of engine vacuum.

A still further object of the invention is to provide apparatus to be used in conjunction with a windshield wiper to apply a cleaning liquid to a windshield, through which the cleaning liquid may be delivered onto the windshield at its top to flow down by force of gravity over the windshield.

Still another object of the invention is to provide apparatus to be used in conjunction with a windshield wiper for applying a cleaning liquid to a windshield, which is so constructed that the time of its functioning is completely under control of the operator, and which will deliver the cleaning liquid onto the windshield for as long a period as the operator of the vehicle desires.

Other objects of the invention will be apparent hereinafter from the specification and from the recital of the appended claims.

Figure 3:
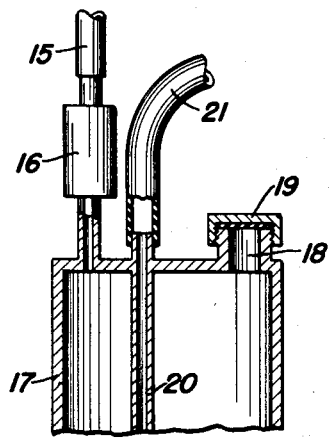
Fig. 3 is a fragmentary vertical section of the tank for the cleaning liquid, and showing the connections thereto.

Referring now to the drawing by numerals of reference 10 denotes the windshield of the vehicle; 11 is the engine block, and 12 is the intake manifold. Mounted at one side of the engine block is a conventional pneumatic booster pump 14, which is adapted to be operated by the engine, and which is connected by a line 15 and a coupling 16 (Fig. 3) to the upper end of a pressure tank 17. Tank 17 is adapted to contain the cleaning liquid. This tank may be filled through port hole 18, which may be closed by cap 19.

Within the tank 17 is a duct 20 which extends down close to the bottom of the tank and draws the liquid from the bottom. This duct is connected by tubing 21 (Figs. 3 and 4) with a duct 22 that leads into a valve casing 24. This casing is secured by screws 25 under the floor-board 26 of the vehicle.

The valve casing 24 is formed with two integral valve chambers 30 and 31. Mounted reciprocably in the valve chamber 30 is a piston-valve 32. This valve has a rod 34 integral with it which projects through the upper end 35 of the valve chamber. The rod 34 is adapted to pass through a hole in the floor-board 26 of the vehicle and has a foot pedal or button 36 secured to or integral with its upper end. Fastened to the rod 34 in any suitable manner, as by welding, is a trip member 38, whose function will appear hereinafter.

Figure 4:
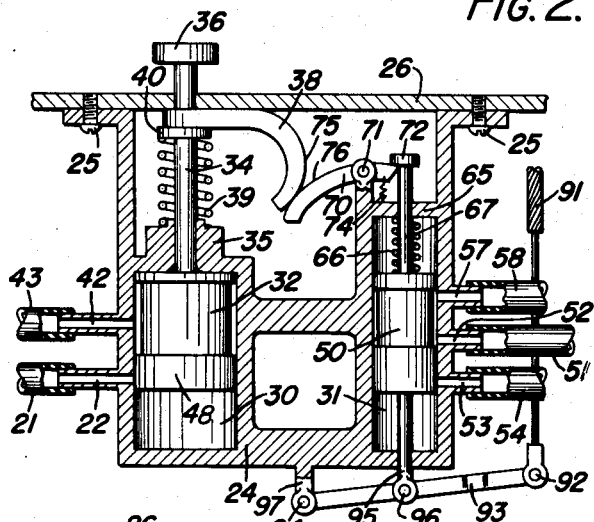
Fig. 4 is a vertical section showing the valve block and foot pedal for controlling the operation of the apparatus of this invention, the two control valves being shown at one of their respective limit positions.

The valve 32 is normally held in its upper position, shown in Fig. 4, by a coil spring 39 which is interposed between the top 35 of the valve chamber 30 and a collar 40 that is integral with or fastened in any suitable manner to the rod 34. The valve casing is connected by a duct 42 and tubing 43 (Figs. 4 and 1) with a coupling 44. This coupling is connected by tubing 45 and 45' (Fig. 1) with outlets 46 and 46', respectively, which are positioned to deliver the cleaning liquid onto the windshield 10 at the top thereof so that the liquid will flow down over the windshield by gravity. The valve 32 is provided with a collar 48 (Fig. 4) which shuts off the duct 22, when the valve is in its upper position, shown in Fig. 4, preventing flow of liquid from the pressure tank 17 to the outlets 46 and 46'. When the valve is held down in the position shown in Fig. 5, however, the ducts 22 and 42 are connected, and the liquid will be forced by air pressure out of the tank 17 through the lines 21, 22, 42, 43, 45 and 45' to the two outlets 46 and 46'.

Figure 1:
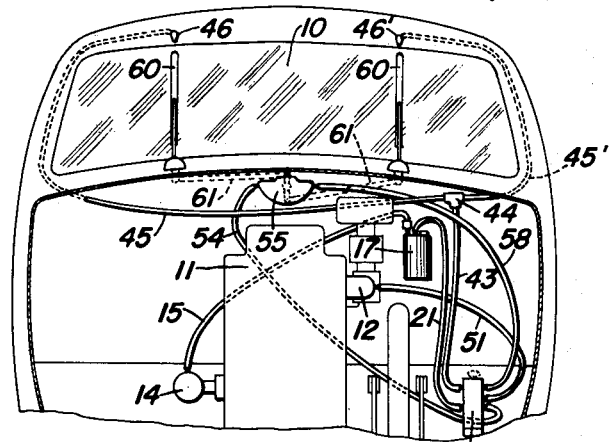
Fig. 1 is a fragmentary part front elevation and part vertical section of an automotive vehicle equipped with a combined windshield wiper and cleaning system constructed according to one embodiment of this invention.

Reciprocably mounted in valve chamber 31 is a piston valve 50. The intake manifold 12 of the vehicle is connected by the tubing 51 and duct 52 with the valve chamber 31. The valve chamber is connected by the duct 53 and tubing 54 (Figs. 4 and 1) with one side of a conventional fluid pressure wiper operating motor 55. The opposite side of this motor 55 is connected to the valve chamber 31 by the duct 57 and tubing 58. The motor 55 may be connected in conventional fashion to the wiper blades 60, as by conventional linkage 61 (Fig. 1). The wiper blades may be of conventional construction, mounted in conventional manner.

Figure 5:
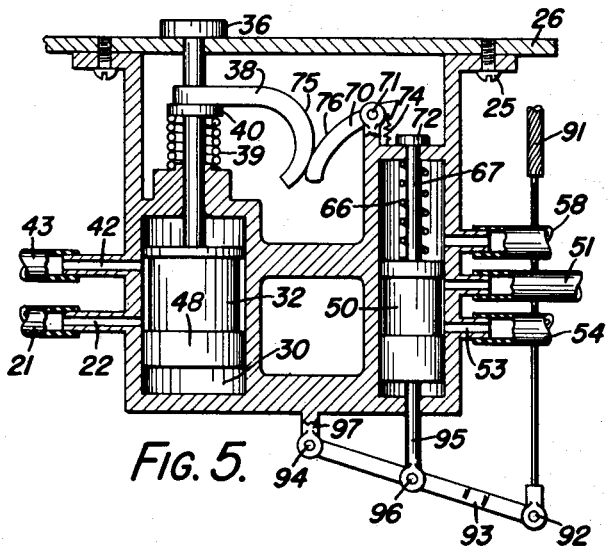
Fig. 5 is a corresponding section showing the valves in their other limit positions.

Interposed between the top of the valve 50 and the top wall 65 of the valve chamber 31 is a coil spring 66 which surrounds the upper stem 67 of the valve and which tends to force the valve to its lowermost position shown in Fig. 5.

When the vehicle is in normal operation, the valve 50 is locked in the upper position shown in Fig. 4 by a pivoted catch 70 which is pivoted on a pin 71 in the valve casing and which is adapted to engage at one end under the head 72 of the valve stem 67. A coil spring 74 which is connected at one end with the catch 70 and at its opposite end with the head 65 of the valve chamber 31, tends to hold the catch in this position. In this position, the tube 58 is connected through the ducts 57 and 52 with the tube 51 and the wiper blade arms 60 are held at one end of their respective strokes.

The catch 70 is adapted to be rocked out of locked position by downward movement of the trip member 38. This trip member has an arcuate surface 75 which is adapted to engage the upper arcuate surface 76 of the catch 70 to rock this catch about its pivot 71 against the resistance of the spring 74, when the foot pedal 36 is pressed down, as shown in Fig. 5. This causes the catch 70 to be disengaged from under the head 72 of the valve stem 67 so that the spring 66 can force the valve 50 down to the position shown in Fig. 5 connecting the tubing 51 through the ducts 52 and 53, and the tubing 54 with the wiper motor 55 to cause the motor to be operated in conventional manner by the suction of the engire 11. Thus, the windshield wipers 60 are put into operation when the driver of the vehicle treads down on the foot pedal 36.

When the foot button 36 is pushed down, the valve 32 is also pushed down. If the driver only desires that the windshield wipers operate, he releases the foot button immediately after depressing it. The spring 39 then returns the valve 32 to its upper position shown in Fig. 4. The downward movement of the valve stem 34 will have caused cam member 38 to disengage catch 70 and spring 66 will have then caused valve 50 to be shifted to its lower position to start the windshield wipers. The spring 39 will act to return valve 32 to its uppermost position instantaneously upon release of the foot pedal 36 and at most the pressure tank 17 will have had time to squirt only a shot of liquid on the windshield through ducts 21, 22, 42, 43, 45 and 45'; and this will do no harm for presumably it will be raining anyway when the windshield wipers are actuated.

If the driver wishes to keep the cleaning liquid flowing onto the windshield, he simply continues to keep the foot button 36 depressed. Cleaning liquid will be forced by air pressure out of the tank 17 through lines 21, 22, 42, 43, 45 and 45' onto the windshield as long as the button is depressed. Hence the windshield can be thoroughly cleaned in a single operation.

Figure 2:
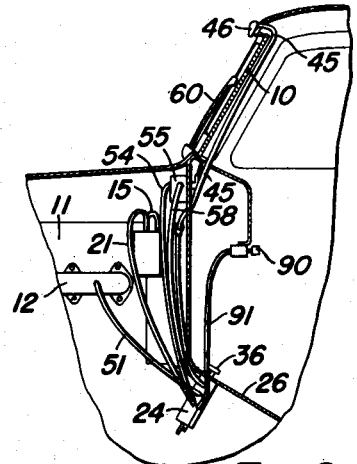
Fig. 2 is a fragmentary, somewhat diagrammatical longitudinal section through the cowl and windshield of the vehicle, showing further details of this apparatus.

Thus, with the mechanism of the present invention, the windshield cleaning mechanism is operated from the same foot pedal which controls the wipers and the windshield wipers can be operated alone or with the cleaning liquid flowing onto the windshield. The cleaning liquid will flow to the outlets 46 and 46', as long as the foot pedal 36 is pressed down. The windshield wipers, however, will continue to operate, once actuated, until the operator pulls on the knob 90 (Fig. 2). This knob may be mounted beneath the dashboard of the vehicle, and is connected to one end of a cable 91 which is pivotally connected at its opposite end by means of a pin 92 to one end of a lever arm 93. Lever arm 93 is pivotally connected at its opposite end by means of a pin 93 to a lug 97 which is formed on the bottom of the valve casing 24. The valve 50 has a rod 95 integral with it and projecting through the bottom of the casing 24 and pivotally connected at its lower end to the lever 93 by means of a pin 96. Hence when the knob 90 is pulled, the lever 93 is rocked upwardly from the position shown in Fig. 5 to that of Fig. 4, and the valve 50 is moved upwardly in its chamber 31 against the resistance of the spring 66. As soon as it returns to its uppermost position, as shown in Fig. 4, and the foot pedal 36 is released, the catch 70 can snap under the head 72 of the valve stem 67 to lock the valve 50 in its uppermost position.

From the preceding description, it will be seen that I have provided apparatus for wiping and cleaning a windshield which the driver can operate wholly with his foot, and which does not require him to remove either hand from the steering wheel. The only hand operation required is to stop the movement of the wipers by pulling on the knob 90. Furthermore, it will be seen that with my apparatus the cleaning liquid is delivered onto the windshield at its top. Still further, it will be seen that the cleaning liquid will flow onto the windshield as long as the pedal 36 is depressed. Moreover, it will be seen that the windshield wiper and the apparatus for supplying the cleaning liquid are operated from a single control member, namely, the pedal 36. It is not necessary to operate a push button several times in order to get enough liquid on the windshield to clean it fully.

While the invention has been described in connection with an embodiment in which the foot button 36 is depressed and then immediately released in order to start the windshield wipers, and the foot pedal is held depressed to cause the cleaning liquid to be applied to the windshield while the wipers are in operation, it will be understood that by providing a suitable detent, I might have three positions of valve 32, namely, an uppermost position such as shown in Fig. 4, an intermediate position at which the valve 32 would have been moved down far enough to release catch 70 and permit spring 66 to shift valve 50 far enough to start the operation of the windshield wipers but in which collar 48 of valve 32 would still not have moved down far enough to uncover port 22, and a lowermost position, such as shown in Fig. 5 in which port 22 is uncovered, and the cleaning liquid is supplied simultaneously with the operation of the windshield wipers. The detent would hold the valve 32 releasably in the intermediate position.

While the invention has been described in connection with a particular embodiment thereof, then, it will be understood that it is capable of further modification, and this application is intended to cover any embodiments of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:
1. The combination in an automotive vehicle of wiper means for wiping the windshield of the vehicle, means for applying a cleaning liquid to the windshield, a source of supply of said cleaning liquid, means for conducting said liquid from said source of supply to said applying means, movable control means controlling actuation of said wiper means, means constantly urging said control means to a position in which said wiper means is inoperative, a valve movably disposed in said conducting means for controlling flow of cleaning liquid to said applying means, means constantly urging said valve to closed position, a single slidable control member reciprocably mounted in the vehicle, and means operatively connecting said control member to both said control means and to said valve to move said control means to a position to render said wiper means operative and to open said valve upon sliding movement of said control member in one direction.

2. The combination in an automotive vehicle of fluid-pressure operated wiper means for wiping the windshield of the vehicle, means connecting the wiper means with the engine of the vehicle to permit actuation of the wiper means from the engine and including a control valve movable to open or close said connection, means constantly tending to move said valve to open position, a releasable detent for holding said valve in closed position, means for applying a cleaning liquid to the windshield a tank containing said cleaning liquid, means for conducting said cleaning liquid from said tank to said applying means, a valve in said conducting means for controlling flow of liquid from said tank to said applying means, means tending to maintain said last-named valve in closed position, means operable to move the last-named valve to open position, and means connecting said last-named valve to said detent to release said detent on movement of the last-named valve to open position.

3. The combination in an automotive vehicle of fluid-pressure operated wiper means for wiping the windshield of the vehicle, means connecting the wiper means with the engine of the vehicle to permit actuation of the wiper means from the engine and including a control valve movable to open or close said connection, means constantly tending to move said valve to open position, a releasable detent for holding said valve in closed position, means for applying a cleaning liquid to the windshield, a tank containing said cleaning liquid, a valve controlling flow of liquid from said tank to said applying means, means tending to maintain said last-named valve in closed position, a depressible foot pedal mounted in the vehicle and connected to the last-named valve to move the last-named valve to open position upon depression of the foot pedal, and means connecting said foot pedal to said detent to release said detent on depression of said foot pedal.

4. The combination in an automotive vehicle of fluid-pressure operated wiper means for wiping the windshield of the vehicle, means connecting the wiper means with the engine of the vehicle to permit actuation of the wiper means from the engine and including a control valve movable to open or close said connection, means constantly tending to move said valve to open position, a releasable detent for holding said valve in closed position, means for applying a cleaning liquid to the windshield, a pressure tank containing said liquid, a supply line connecting the tank with said applying means, a valve incorporated in said line controlling flow of liquid therethrough, means tending to maintain said last-named valve in closed position, a depressible foot pedal mounted in the vehicle for opening said last-named valve when depressed, a trip member carried by said foot pedal and adapted to release said detent when the foot pedal is depressed, and a pump driven by the engine when the engine is operating for supplying compressed air to said tank to force the liquid out of the tank when said last-named valve is opened.

5. A combined wiping and cleaning mechanism for windshields of automotive vehicles, comprising a wiper mechanism, a casing having an inlet for cleaning liquid, an outlet duct for conducting liquid from said casing to the windshield, a valve reciprocably mounted in said casing and controlling connection between said inlet and said outlet, a second inlet connected with the engine manifold of said vehicle, a pair of ducts connected to the wiper mechanism, a second valve slidably mounted in said casing to connect at different positions, respectively, of its sliding movement the two ducts of said pair of ducts with said second inlet, and a single control member slidable in said casing for operating both valves.

6. A combined wiping and cleaning mechanism for windshields of automotive vehicles, comprising a wiper mechanism, a casing having an inlet for cleaning liquid, an outlet duct for conducting liquid from said casing to the windshield, a valve reciprocably mounted in said casing and controlling connection between said inlet and said outlet, a second inlet connected with the engine manifold of said vehicle, a pair of ducts connected to the wiper mechanism, a second valve reciprocably mounted in said casing for sliding movement in the same direction as said first valve to connect at different positions, respectively, of its sliding movement the two ducts of said pair of ducts with said second inlet, and a single control member slidable in said casing for operating both valves.

7. A combined wiping and cleaning mechanism for windshields of automotive vehicles comprising wiper mechanism, a casing having an inlet for cleaning liquid, means for forcing said liquid under pressure into said inlet, an outlet duct for conducting liquid from said inlet to the windshield, a valve reciprocably mounted in said casing and controlling connection of said outlet duct with said inlet, a second inlet in said casing connected with the engine manifold of the vehicle, a pair of ducts connected to the wiper mechanism, a second valve reciprocably mounted in said casing, a spring constantly urging said second valve in one direction to connect one of said pair of ducts with said second inlet, a detent for holding said second valve in position to connect the other of said pair of ducts with said second inlet, a control member reciprocable in said casing, means connected to said control member and operable on movement of said control member in one direction to disengage said detent, a spring constantly urging said control member in the opposite direction, and means connecting said control member to said first valve to shift said first valve in opposite directions, respectively, upon movement of said control member in opposite directions.

8. The combination in an automotive vehicle of fluid-pressure operated wiper means for wiping the windshield of the vehicle, liquid spray means for cooperation therewith, a source of liquid supply, means for conducting liquid from said source to said spray means, a movable valve mounted in said conducting means for controlling supply of liquid from said source to said liquid spray means, means for actuating said wiper means a second movable valve mounted in said actuating means for controlling actuation of said wiper means, a reciprocable control member, means connecting said control member to both said valves to cause movement of each of said valves in one direction on movement of said control member in one direction, and means constantly urging said control member in the opposite direction.

9. The combination with an automotive vehicle, of fluid-pressure operated wiper means for wiping the windshield of the vehicle, liquid spray means for cooperation therewith, a source of liquid supply, means for conducting liquid from said source to said spray means, a valve reciprocable in said conducting means for controlling supply of liquid from said source to said liquid spray means, means for actuating said wiper means, a second valve reciprocable in said actuating means for controlling actuation of said wiper means, a spring constantly urging said second valve in one direction, a detent for holding said second valve at the limit of its movement in the opposite direction, a foot pedal, means connected to said foot pedal and operable on movement of said foot pedal in one direction to disengage said detent, a spring constantly urging said foot pedal in the opposite direction, and means connecting said foot pedal to the first valve to shift said first valve in opposite directions, respectively, upon movement in opposite directions of said foot pedal.

10. The combination with an automotive vehicle, of fluid-pressure operated wiper means for wiping the windshield of the vehicle, liquid-spray means for co-operation therewith comprising a storage tank for liquid, a pump operable upon operation of the engine of the vehicle for pumping liquid from said tank, means for conducting liquid from said tank to the windshield, and a valve mounted in said conducting means for controlling flow of liquid from said tank to said windshield, actuating means for said wiper means, a second valve mounted in said actuating means for controlling actuation of said wiper means, a reciprocable foot pedal, a spring constantly urging said second valve in one direction, a detent for holding said second valve at the limit of its movement in the opposite direction, means connected to said foot pedal and operable on movement of said foot pedal in one direction to disengage said detent, a spring constantly urging said foot pedal in the opposite direction, and means connecting said foot pedal to the first valve to shift said first valve in opposite directions, respectively, upon movement in opposite directions of said foot pedal.

References Cited in the file of this patent
UNITED STATES PATENTS

| | | |
|---|---|---|
| 1,237,338 | Hogg | Aug. 21, 1917 |
| 1,932,615 | Bumpass | Oct. 31, 1933 |
| 1,973,939 | West | Sept. 18, 1934 |
| 2,162,985 | West | June 20, 1939 |
| 2,173,021 | Longwell | Sept. 12, 1939 |
| 2,191,009 | Clarke | Feb. 20, 1940 |
| 2,323,470 | Horton | July 6, 1943 |